United States Patent [19]
Oda et al.

[11] Patent Number: 6,100,983
[45] Date of Patent: Aug. 8, 2000

[54] OBJECT SENSING APPARATUS HAVING FILTER MEMBER

[75] Inventors: Hajime Oda; Hitoshi Ito, both of Yotsukaida, Japan

[73] Assignee: Seiko Precision Inc., Japan

[21] Appl. No.: 09/116,320

[22] Filed: Jul. 15, 1998

[30] Foreign Application Priority Data

Jul. 15, 1997 [JP] Japan .................................. 9-189842

[51] Int. Cl.⁷ .............................. G01B 11/14; G01C 3/08
[52] U.S. Cl. ...................... 356/375; 356/3.04; 356/4.01
[58] Field of Search ................................ 356/3.02–3.1,
356/445, 446, 342, 375, 3, 3.01, 4.01–4.05,
4.07, 4.08; 396/104, 111, 120; 359/613

[56] References Cited

U.S. PATENT DOCUMENTS

| | | | |
|---|---|---|---|
| 3,214,596 | 10/1965 | Schwerdt, Jr. et al. | 356/445 |
| 5,220,453 | 6/1993 | McKinley et al. | 359/481 |
| 5,455,669 | 10/1995 | Wetteborn | 356/5.01 |
| 5,602,376 | 2/1997 | Coleman et al. | 235/462 |

FOREIGN PATENT DOCUMENTS 4-730151  11/1995  Japan .
2243442  10/1991  United Kingdom .

OTHER PUBLICATIONS

Patent Abstracts of Japan, vol. 11, No. 126 (P–569), Apr. 21, 1987, and Japanese Patent No. 61–269087, Nov. 28, 1986.

*Primary Examiner*—F. L. Evans
*Attorney, Agent, or Firm*—Adams & Wilks

[57] ABSTRACT

An object sensing apparatus comprises a distance measuring device for measuring a distance to an object to be sensed, and a filter member having a surface disposed in confronting and spaced-apart relation to the distance measuring device. The distance measuring device has a light projecting element for projecting light toward the object and a light receiving element for receiving the light projected by the light projecting element and reflected by the object. The filter member is disposed at a preselected angle of inclination with respect to the distance measuring device. When the light projecting element projects light toward the object, light reflected or scattered by the surface of the filter member is directed in a direction away from the light receiving element.

21 Claims, 6 Drawing Sheets

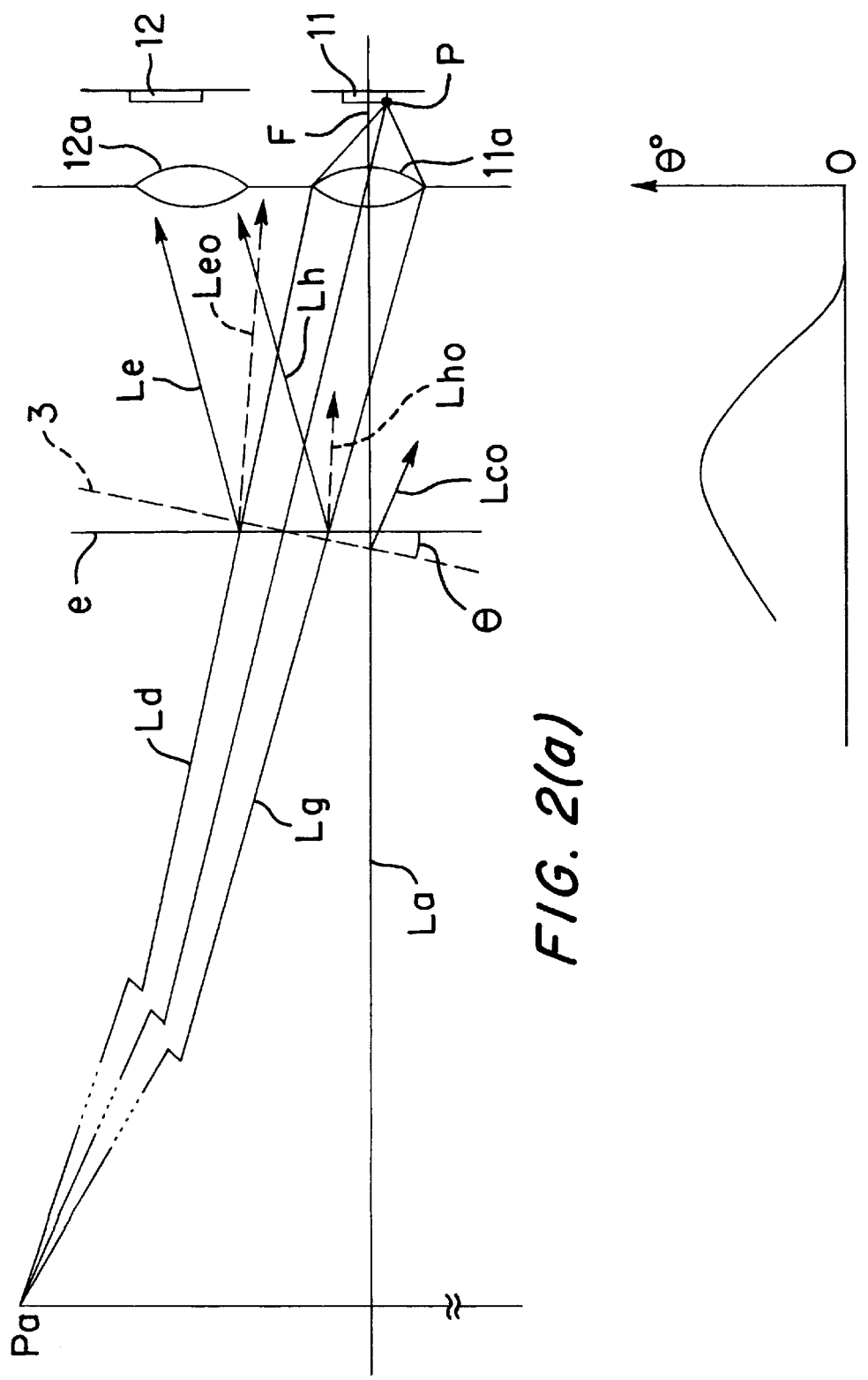

OBJECT SENSING APPARATUS HAVING FILTER MEMBER

BACKGROUND OF THE INVENTION

1. Field of the Invention

The present invention relates to object sensing apparatuses and, more particularly, to an object sensing apparatus for accurately sensing an object, such as a human body or the like, approaching an automatic door or the like.

2. Background of the Invention

Conventionally, there is known a trigonometric distance measuring device in which light projected from a light projecting element, such as an infrared-ray diode, is projected through a projecting lens, and light reflected from an object to be sensed, such as a human body, is received by a light receiving element, such as a PSD (position sensitive detector) placed behind a light receiving lens at a predetermined distance from the light projecting element.

An object sensing apparatus for a safety apparatus utilizing such conventional distance measuring device is also known. The distance measuring device is disposed, for example, in the vicinity of an automatic door, or is attached to the door itself. By this construction, when the object sensing apparatus senses an object, such as a human body, passing or approaching the automatic door, the distance measuring device measures the distance from the door to the object and an appropriate determination is made to open or close the door, or to prevent the door from closing when someone is passing through.

FIG. 7 shows a conventional object sensing apparatus employing a distance measuring device a of the type described above. Using this conventional apparatus, it is impossible to obtain an accurate distance measurement of an object T at a particular distance Z. The distance measuring device a is attached to an installation site S in a retracted location thereof at a distance c from a front end surface b of the installation site, thereby providing a cavity d in front of the distance measuring device a. With this structure, there is a necessity that a distance measurement be positively made on a left side of the front end surface b or over an entire range where there is a possibility that an object or an individual may approach. If the distance measuring device a is installed at a retracted location as set forth above, dust or the like tends to accumulate within the cavity d or in the vicinity of an opening of the installation site S. In order to avoid this, and thereby prevent malfunction of the object sensing apparatus, a protection cover, filter or the like (hereinafter referred to as a filter member e) is provided at a location close to the front end surface b of the installation site S.

A particular example where a filter member is provided in front of a distance measuring device as described above is in an auto-focusing camera. If the filter member e is instead provided at a distance of approximately c from the front end surface b of the installation site S and in parallel relation with the distance measuring device a, a light beam La projected from a light projecting element f of the distance measuring device a passes through a light projecting lens g and is projected onto the object T to be sensed. A light component Lb reflected by the object T then transmits through a light receiving lens h and is received by a light receiving element i of the distance measuring device a. In this process, part of the light beam La is scattered by an inner surface of the filter member e, causing a light component Lc. Also, a light beam Ld transmitted through an end of the light projecting lens g similarly causes a reflected light component Le or a scattering light component Lf by the inner surface of the filter member e. These light components transmit through the light receiving lens h and are received by the light receiving element i. This extra reflected or scattering light, when received by the light receiving element i, causes error in a measurement result obtained by the distance measuring device a, thereby rendering accurate distance measurements impossible.

A detailed explanation of light reflected by an inner surface of the filter member e is provided with reference to FIG. 8(a). The light projecting element f is usually arranged behind a focal point F of the light projecting lens g so that an image thereof is focused at a point distant by a predetermined distance from the light projecting lens g. The light transmitting through the light projecting lens g involves light beams from secondary light sources, such as reflection by a substrate fixed with the light projecting element f, a stem, and a surface of a case, in addition to direct light from the light projecting element f. If an outer peripheral point thereof is taken at P, the point P is focused at Pa due to light beams Ld,Lg transmitting through the light projecting lens g.

With the filter member e arranged in parallel with a plane vertical to the light projecting axis of the light projecting element f, a study was conducted on the reflecting direction of light from light components Ld,Lg which is reflected by the inner surface of the filter member. The study was conducted for respective cases where a filter member e1 was at a location closer to the light projecting lens g than a location of the filter member e, and where a filter member e2 was at a location more distant from the light projecting lens g than a location of the filter member e. Scattering light from the reflecting surface was considered negligible and excluded from the study.

The light components resulting from reflection of the light component Ld and the light component Lg by the inner surface of the filter members e1, e, e2 are Le1,Lh1, Le,Lh and Le2,Lh2, respectively.

The reflected light components Le1 and Lh1 by the filter member e1 closest to the lens did not transmit through the light receiving lens h and did not arrive at the light receiving element i, thereby having no effect upon a measurement result.

However, the reflected light components Le and Lh by the filter member e both transmitted through the light receiving lens h and arrived at the light receiving element i, thereby having an effect upon a measurement result.

The reflected light Le2 by the filter member e2 did not transmit through the light receiving lens h and did not arrive at the light receiving element i. However, the reflected light Lh2 transmitted through the light receiving lens h and arrived at the light receiving element i, thereby having an effect upon a measurement result.

The degree of effect on a measurement result depends upon various conditions such as an aperture of the light projecting/receiving lens, the base line length (distance between the light projecting and receiving lenses), the size of the light projecting element, the location of the light projecting element (distance from the lens), the magnitude of secondary light, the condition of the reflecting surface of the filter member (magnitude and direction of diffusing reflection due to difference in smoothness), the size and arrangement of the light receiving element, and the location of the reflecting surface of the filter member. However, qualitatively, as shown in FIG. 8(b), where the magnitude of an effect on a measurement result is taken in a vertical axis and a distance from the lens is taken in a horizontal axis, there is almost no effect on a measurement result for the filter member e1 located at a distance R from the lens. In contrast, the effect on measurement result gradually changes as the distance R is exceeded and the lens becomes distant. The effect becomes maximum at the location of the filter member e, it decreases as the distance from the lens increases, and it becomes small at a location of the filter member e2.

In view of the foregoing, there is a necessity to place the entire range that a passer or object may approach at a distance between the filter member and the lens in order to positively perform distance measurement. If the filter member e is placed in parallel relation with a plane vertical to the light projecting axis, errors occur in the measurement result, thereby rendering it difficult to obtain an accurate distance measurement.

SUMMARY OF THE INVENTION

In order to solve the foregoing problems in the conventional art, the object sensing apparatus according to the present invention has a filter member provided at an angle of inclination at which light projected from a light projecting device and emitted or scattered by an inner surface of the filter member is reflected in a direction different from a direction toward a light receiving device. By this construction, a distance over an entire range in which there is a possibility that a passer or an object may approach can be accurately and efficiently measured. Furthermore, accurate distance sensing is possible without errors occurring in a result of a distance measurement to the passer or object to be sensed.

It is therefore an object of the present invention to provide an object sensing apparatus which can sense an object and perform a distance measurement to the object with high accuracy and efficiency.

The foregoing and other objects of the present invention are achieved by an object sensing apparatus comprising distance measuring means for measuring a distance to an object to be sensed, and a filter member disposed in confronting and spaced-apart relation to the distance measuring means. The distance measuring means includes light projecting means for projecting light toward the object and light receiving means for receiving the light projected by the light projecting means and reflected by the object. The filter member is disposed at a preselected angle of inclination with respect to the distance measuring means. When the light projecting means projects light toward the object, light reflected or scattered by the filter member is directed in a direction different from a direction toward the light receiving means (i.e., in a direction away from the light receiving means).

In another embodiment, the filter member has a surface portion or spot area for reflecting light projected by the light projecting means having a preselected brightness, the surface portion being disposed at the angle of inclination with respect to a light projecting axis of the light projecting means.

In another embodiment, the light projecting means and the light receiving means are disposed in a plane in juxtaposed relation. A distance between a first end of the filter member and the light projecting means is greater than a distance between a second end of the filter member opposite the first end and the light receiving means.

In yet another embodiment, the light projecting means and the light receiving means are disposed in a plane in juxtaposed relation. The filter member has first and second portions, one of the first and second portions being disposed at the angle of inclination with respect to a light projecting axis of the light projecting means.

Preferably, the filter member is disposed within a distance measurable range of the distance measuring means and in the vicinity of a boundary of the distance measurable range.

BRIEF DESCRIPTION OF THE DRAWINGS

The foregoing summary, as well as the following detailed description of the preferred embodiments of the invention, will be better understood when read in conjunction with the accompanying drawings. For the purpose of illustrating the invention, there is shown in the drawings embodiments which are presently preferred. It should be understood, however, that the invention is not limited to the precise arrangement and instrumentalities shown. In the drawings:

FIG. 2(a) is an explanatory view for explaining a state of light beams in the object sensing apparatus of FIG. 1, and FIG. 2(b) is a graph showing a relationship between a distance from a distance measuring means to a filter member and an angle of inclination of the filter member according to the present invention;

DETAILED DESCRIPTION OF THE PREFERRED EMBODIMENTS

While this invention is susceptible of embodiments in many different forms, this specification and the accompanying drawings disclose only preferred embodiments of the invention. The invention is not intended to be limited to the embodiments so described, and the scope of the invention will be pointed out in the appended claims.

Figure 1:
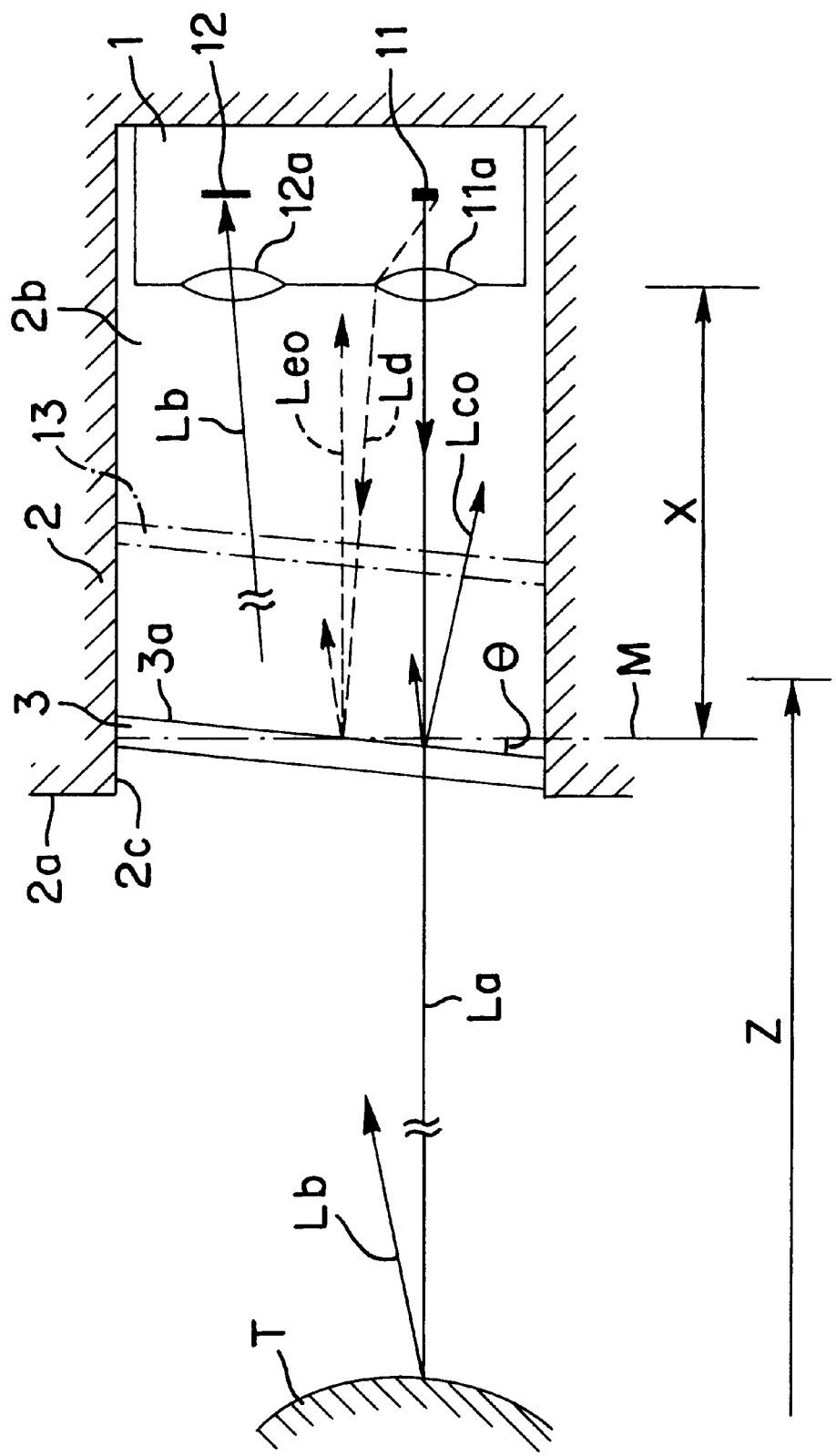
FIG. 1 is sectional view of an object sensing apparatus according to a first embodiment of the present invention.

A first embodiment of the object sensing apparatus according to the present invention is shown in FIGS. 1–2. A distance measuring device 1 is accommodated in and attached to an inner surface of support or attaching member 2. The attaching member 2 has a depth which is deeper than a thickness of the distance measuring device 1. When the distance measuring device 1 is fixed to the inner surface of the attaching member 2, as shown in FIG. 1, a cavity 2b exists between a front surface 2 of the attaching member 2a and a front surface of the distance measuring device 1. The cavity 2b has, at a front end, an opening 2c arranged with a filter member 3 disposed in confronting and spaced-apart relation to the distance measuring device 1.

The distance measuring device 1 has a light projecting element 11 and a light receiving element 12, such as a PSD, juxtaposed at a predetermined spacing in a plane. A light projecting lens 11a and a light receiving lens 12a are arranged in front of the light projecting element 11 and the light receiving element 12, respectively. A distance between a center of the lenses 11a, 12a and a center of the filter member 3 is designated by X, so that the distance measuring device 1 has a distance measurable range Z beginning from a position that is closer to a lens side than a center of the filter member 3. Consequently, since the front surface 2a of the attaching member 2 is at within the distance measurable range Z close to a boundary thereof, the distance to an object T to be sensed can be sufficiently measured even where it approaches the front surface 2a.

The filter member 3 is arranged with an inclination at a predetermined angle θ so that the light from the light projecting element 11 which is reflected or scattered by an inner surface 3a of the filter member 3 is reflected in a direction different from a direction toward the light receiving element 12 (i.e., reflected in a direction away from the light receiving element 12). That is, in this embodiment, the filter member 3 is inclined at an angle θ with respect to a vertical plane M normal to the light beam La along a light projecting axis of the light projecting element 11. The filter member 3 is arranged at an inclination to the vertical plane M so that the distance between one end (upper end in FIG. 1) of the filter member 3 and the light receiving element 12 is smaller than the distance between the other end (lower end in FIG. 1) of the filter member 3 and the light projecting element 11.

Figures 8A, 8B:
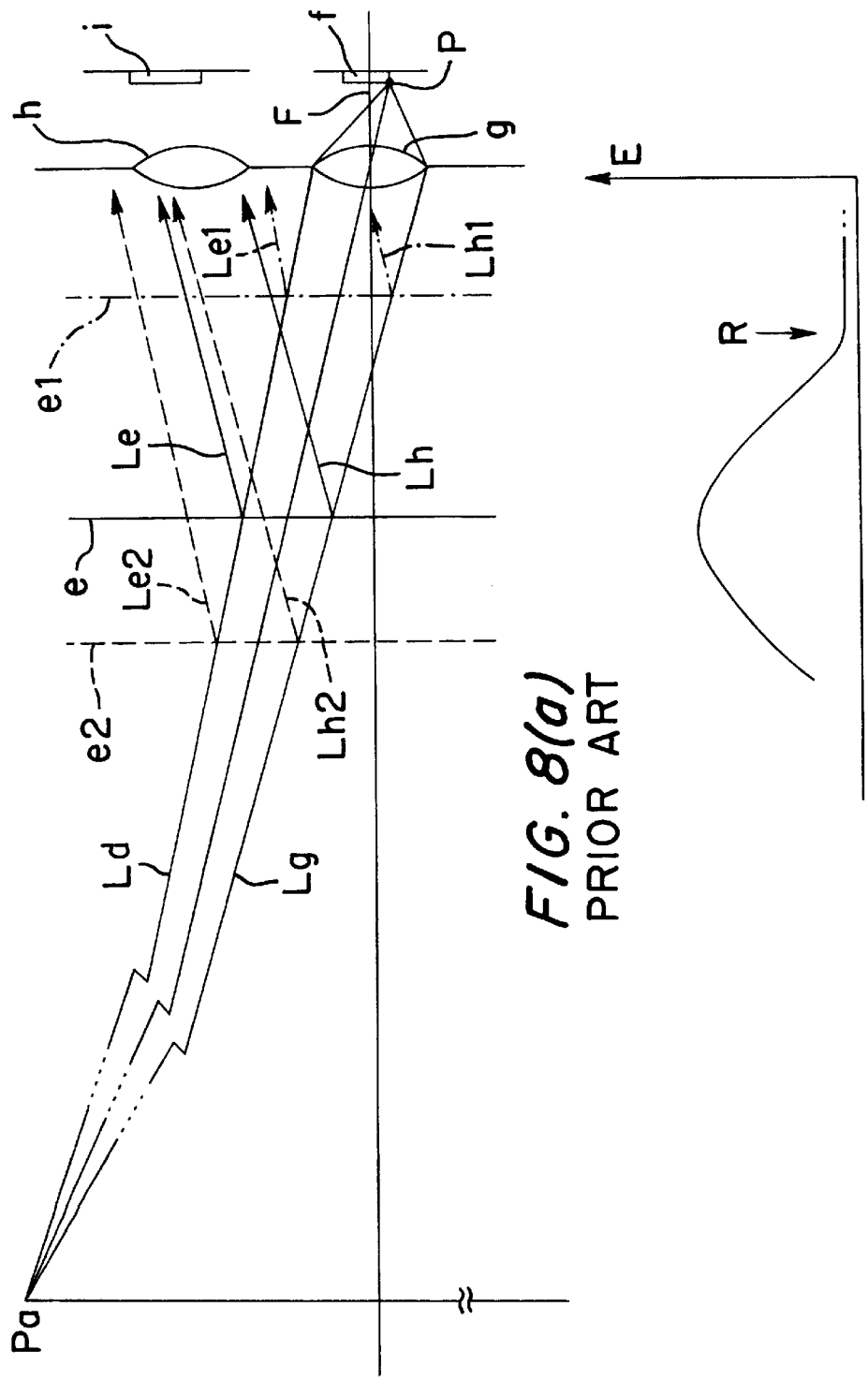
FIG. 8(a) is an explanatory view for explaining a state of light beams in the conventional object sensing apparatus of FIG. 7.
FIG. 8(b) is a graph showing a relationship between a distance from a distance measuring means to a filter member of the conventional object sensing apparatus and a magnitude of affection on a measurement result due to reflected light by an inner surface of the filter member.

By inclining the filter member 3 with respect to the vertical plane M as set forth above, the direction of light which is reflected at the inner surface of the filter member 3 differs from the direction of light which is reflected at the inner surface of the filter member e described above for the conventional object sensing apparatus of FIG. 8. A comparison of such different reflected light directions is shown in FIG. 2. With the filter member e placed perpendicular to light beam La, the reflected light beams Le,Lh (shown in sold lines) pass through the light receiving lens 12a and arrive at the light projecting element 12 as described above with respect to FIG. 8. In contrast, according to the present invention, with the filter member 3 inclined at the angle θ, the reflected light is directed downward as light components Le0, Lh0 and Lc0, as shown by dotted lines in FIG. 2(a), and do not pass through the light receiving lens 12a and to the light projecting element 12.

Consequently, the light from the light projecting element 11 passing through the filter member 3 is reflected by the object T to be sensed as light beam Lb. The reflected light beam Lb passes through the filter member 3 and the light receiving lens 12a and arrives at the light receiving element 12. Thus it is possible, according to the present invention, to accurately and efficiently obtain a distance measurement to the object T to be sensed without being affected by reflected light or scattered light from the filter member 3. Even where the filter member is moved close to the lens side, as shown by the one-dot chain lines designated at 13, if the filter member 3 is arranged at an inclination at the predetermined angle θ, as set forth above, an accurate distance measurement to the object T can also be obtained.

As shown in FIG. 2a, a light beam Ld that passes through the light projecting lens 11a and is incident on the inner surface of the filter member 3 is partially reflected as a light Le0. The light from an upper portion of a point P of the light projecting element 11 is projected downward with respect to the light beam Ld. Accordingly, the angle θ of the filter member 3 may be set to an angle such that the reflected light Le0 is not directed through the light receiving lens 12a and to the light receiving element 12 in order to avoid an effect on a distance measurement.

There is also the case that diffused reflection occurs due to the light Ld at the inside of the filter member 3. The effect of this diffused reflection increases as the distance at which the filter member 3 is placed is increased. As shown in FIG. 2b, the required angle of inclination θ is qualitatively given by an angle θ taken in a vertical axis and a distance from the lens taken in a horizontal axis. If the filter member 3 is placed at a position near the light projecting lens 11a, there is no necessity to incline the filter member. However, as the filter member 3 is moved to a position away from the distance measuring device 1, there is a necessity to gradually increase the angle θ. As the filter member 3 is moved in a direction away from the distance measuring device 1, exceeding the position where a maximum angle of inclination is required, the inclination may be at an angle smaller than the maximum angle.

As described above, since an optimum angle of inclination θ is determined by various structural conditions and the diffusing reflection, a predetermined angle θ is required to be determined by experimentation. For example, if a diameter of the light projecting lens is 13 mm and a focal distance thereof is 13 mm, a diameter of the light receiving lens is 13 mm and a focal distance thereof is 9 mm, a base line length is 20 mm, a spot diameter of the light projecting element main projecting light is 0.6 mm, and the filter member is installed at distance remote from the light projecting lens, the angle of inclination θ is appropriately set at 23 degrees. Where the filter member is installed at a distance of 70 mm, the angle of inclination θ is appropriately set at 18 degrees.

Figure 3A:
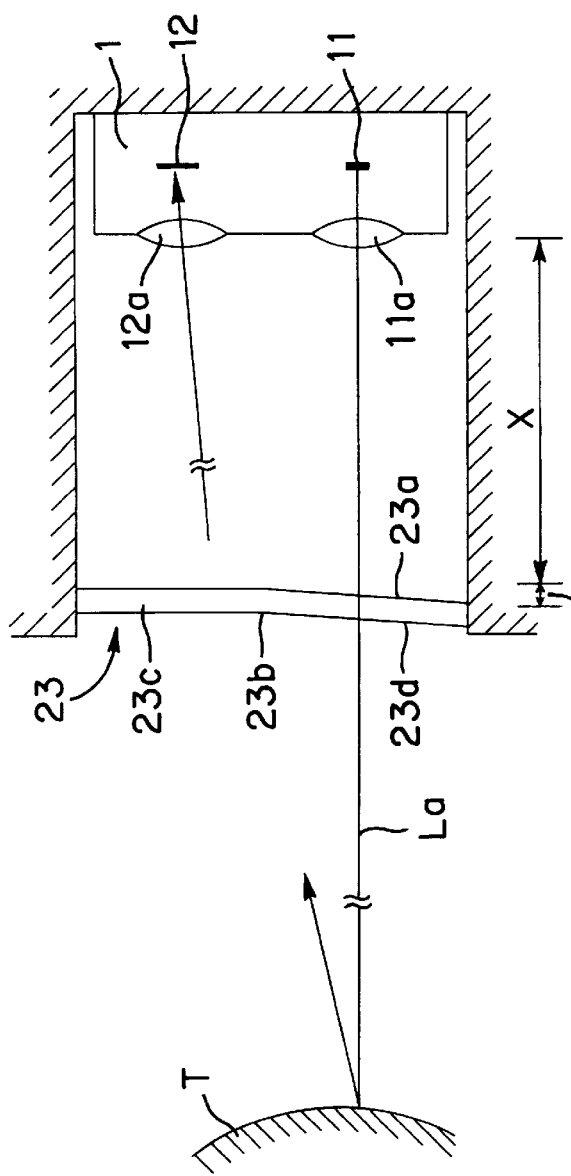
FIG. 3(a) is a sectional view of an object sensing apparatus according to a second embodiment of the present invention.
Figure 3B:
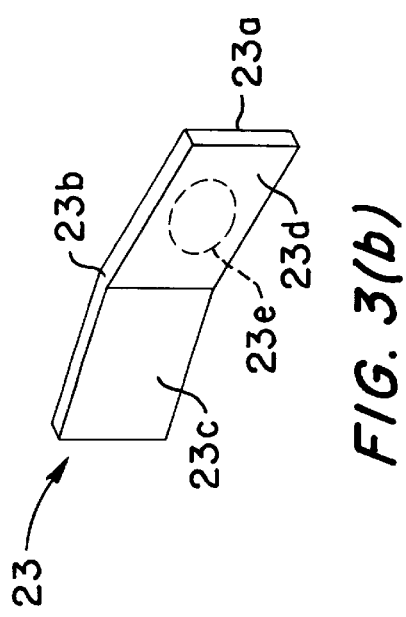
FIG. 3(b) is a perspective view of a filter member of the second embodiment.

FIGS. 3(a) and 3(b) shows a second embodiment of the object sensing apparatus according to the present invention. In this embodiment, the filter member 23 has a bent central portion 23b with respect to left and right directions. That is, the central portion 23b has, on a left side, a left portion 23c disposed opposite to the light receiving lens 12a and extending perpendicular to the light projecting axis of light beam La of the light projecting element 11. The central portion 23b of the filter member 23 has, on a right side thereof, a right portion 23d disposed opposite to the light projecting lens 11a.

As shown in FIG. 3(b), the right portion 23d of the filter member 23 has a surface portion at which an emitted light beam from the light projecting element 11 includes a spot area 23e with a predetermined brightness. In the spot area 23e, the reflected light due to the inner surface 23a of the filter member 23 has a brightness having an effect upon a distance measurement result. The right portion 23d is inclined by a predetermined angle with respect to a vertical plane to the light projecting axis. More specifically, the center of each lens 11a and 12a is disposed at a distance X to the central portion 23b of the filter member 23, and the right portion 23d of the filter member 23 is disposed at an angle of inclination defined by a distance a from the central portion 23b.

Since the right portion 23d of the filter member 23 where the spot area 23e is located is inclined by bending or deviating the filter member 23 as shown in FIGS. 3(a), 3(b), the reflected light at the spot area 23e within the inner surface of the filter member 23 is reflected downwardly, thereby avoiding passage through the light receiving lens 12a. Accordingly, the reflected light does not arrive at the light receiving element 12 and no error in a distance measurement results.

Figure 4:
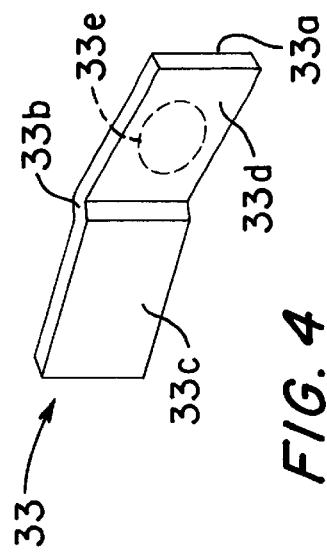
FIG. 4 is perspective view of a filter member according to a third embodiment of the present invention.

FIG. 4 shows a third embodiment of a filter member 33 according to the present invention. The filter member 33 is bent or deviated at a central portion 33b in a direction toward the projecting lens by a distance α in a manner similar to that shown in FIG. 3, and a right portion 33d is inclined similarly to the second embodiment in order to align the left and right ends of the filter member 33 at a same level. A left portion 33c of the filter member 33 is similar to the left portion 23 of the second embodiment. Therefore, like in the second embodiment, a spot area 33e on the right portion 33e of the filter member 33 is inclined so that light within the surface of the spot area 33e is reflected downward. Accordingly, there is no transmission of reflected light through the light receiving lens 12a and, therefore, the reflected light is not incident on the light receiving element 12. By this construction, errors in distance measurement results are effectively prevented.

Figure 5:
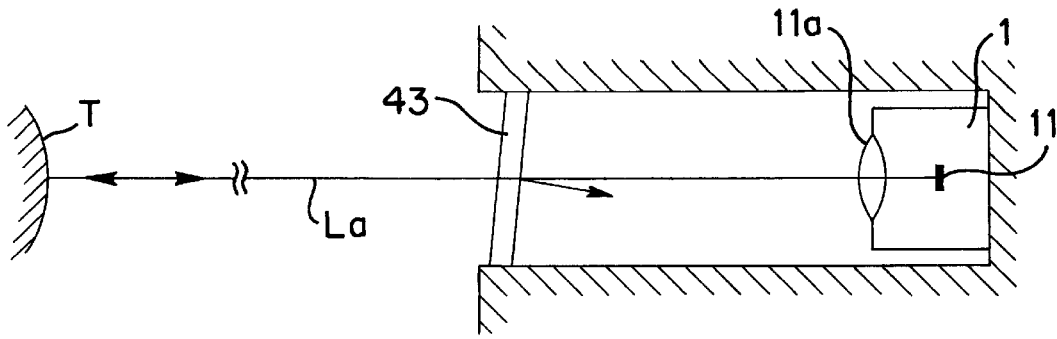
FIG. 5 is a sectional view of an object sensing apparatus according to a fourth embodiment of the present invention.

FIG. 5 shows a fifth embodiment of the object sensing apparatus according to the present invention. In this embodiment, a filter member 43 has a vertically inclined angle with respect to the vertical plane perpendicular to the light projecting axis of the light beam La projected from the light projecting element 11. The filter member 43 has an upper portion inclined in a direction toward the distance measuring device 1. However, the inclination direction of the filter member 43 is not limited to the direction shown in FIG. 5, and the upper portion of the filter member 43 may be inclined in a direction away from the distance measuring device 1.

Figure 6A:
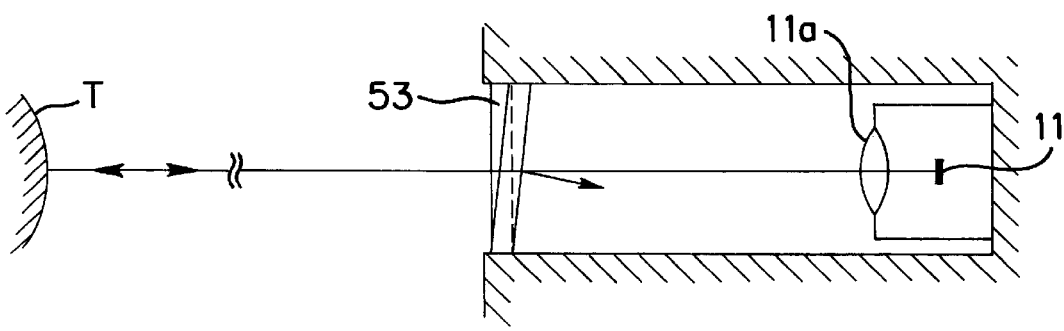
FIG. 6(a) is a sectional view of an object sensing apparatus according to a fifth embodiment of the present invention.
Figure 6B:
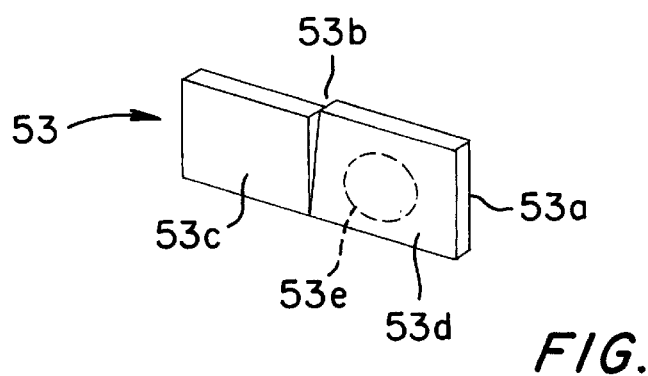
FIG. 6(b) is a perspective view of a filter member of the fifth embodiment.
Figure 7:
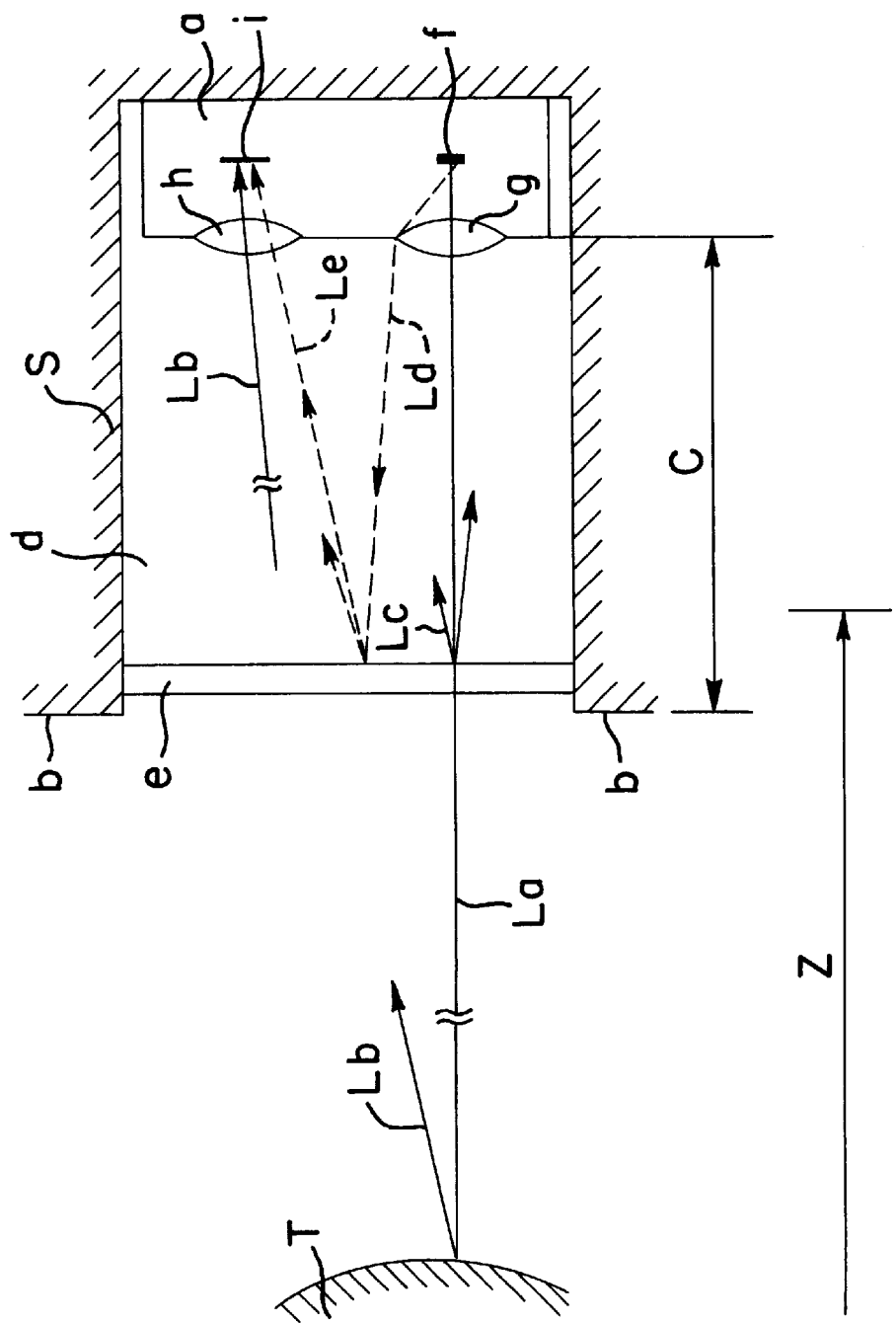
FIG. 7 is a sectional view of a conventional object sensing apparatus.

FIGS. 6(a) and 6(b) show a fifth embodiment of the object sensing apparatus according to the present invention. In this embodiment, a filter member 53, has a central boundary portion 53b, a left portion 53c opposite to the light receiving element and extending perpendicular to the light projecting axis of the light beam La projected from the light projecting element. The filter member 53 also has a right portion 53d including a spot area 53e and extending at an inclined angle to the light projecting axis. The right portion 53d may be inclined in a direction toward the distance measuring device 1, or in a direction away from the distance measuring device 1.

In the filter members 43, 53 of the fourth and fifth embodiments, respectively, the spot area is inclined so that the light within the surface of the filter members is reflected downward and upward. Thus the reflected light will not be incident on the light receiving element 1, thereby preventing errors from occurring in distance measurement results.

In the embodiments of FIGS. 3(a)–3(b) and FIGS. 6(a)–6(b), although the central portions of the filter member are sharply bent to define the angles of inclination, it is preferred that the angles of inclination be varied by a moderate curved surface.

The object sensing apparatus according to the present invention described above has the following advantages.

The filter member is provided in confronting and spaced-apart relation to the distance measuring device. Thus, where there is a possibility that the passer or object to be detected will approach the object sensing apparatus, it is possible to define an entire sensing range within a distance measurable range without excluding distances which have been impossible to measure with conventional object sensing apparatuses. This will avoid a failure to measure a distance when an object or passer to be sensed approaches the sensing apparatus.

The filter member is provided at an angle of inclination to the light projecting axis of a light beam projected by the light projecting element. By this construction, the light projected from the light projecting element and reflected or scattered by an inner surface of the filter member can be reflected in a direction different from a direction toward the light receiving element. Thus, there is less possibility that light other than the light reflected by an object or passer to be sensed is received by the light receiving element, thereby enabling distance measurements with high accuracy.

The inclination of the filter member can be achieved by inclining only a portion of the filter member which includes a spot area with a predetermined brightness, or by slanting the entire filter member in left and right directions or in upper and lower directions. It is therefore possible to select a slanting state of the filter member which is optimal for a particular application, thereby providing greater freedom of design.

The filter member is provided within a distance measurable range by the distance measuring device in the vicinity of a boundary thereof. Thus it is possible to reduce the spacing between the distance measuring device and the filter member to a required minimum, thereby making it possible to reduce the overall size of the object sensing apparatus.

From the foregoing description, it can be seen that the present invention comprises an improved object sensing apparatus. It will be appreciated by those skilled in the art that obvious changes can be made to the embodiments described in the foregoing description without departing from the broad inventive concept thereof. It is understood, therefore, that this invention is not limited to the particular embodiments disclosed, but is intended to cover all obvious modifications thereof which are within the scope and the spirit of the invention as defined by the appended claims.

What is claimed is:

1. An object sensing apparatus comprising: distance measuring means for measuring a distance to an object to be sensed, the distance measuring means including light projecting means for projecting light toward the object and light receiving means for receiving the light projected by the light projecting means and reflected by the object; and a filter member disposed in confronting and spaced-apart relation to the distance measuring means, the filter member having a first end and a second end opposite the first end and being disposed at a preselected angle of inclination with respect to the distance measuring means such that a distance between the first end of the filter member and the light protecting means is greater than a distance between the second end of the filter member and the light receiving means, whereby when the light projecting means projects light toward the object, light reflected or scattered by the filter member is directed in a direction away from the light receiving means.

2. An object sensing apparatus according to claim 1; wherein the filter member has a surface portion for reflecting light projected by the light projecting means having a preselected brightness, the surface portion being disposed at the angle of inclination with respect to a light projecting axis of the light projecting means.

3. An object sensing apparatus according to claim 2; wherein the light projecting means and the light receiving means are disposed in a plane in juxtaposed relation.

4. An object sensing apparatus according to claim 3; wherein the filter member is disposed within a distance measurable range of the distance measuring means and in the vicinity of a boundary of the distance measurable range.

5. An object sensing apparatus according to claim 2; wherein the light projecting means and the light receiving means are disposed in a plane in juxtaposed relation; and wherein the filter member has first and second portions, one of the first and second portions being disposed at the angle of inclination with respect to a light projecting axis of the light projecting means.

6. An object sensing apparatus according to claim 5; wherein the filter member is disposed within a distance measurable range of the distance measuring means and in the vicinity of a boundary of the distance measurable range.

7. An object sensing apparatus according to claim 2; wherein the filter member is disposed within a distance measurable range of the distance measuring means and in the vicinity of a boundary of the distance measurable range.

8. An object sensing apparatus according to claim 1; wherein the light projecting means and the light receiving means are disposed in a plane in juxtaposed relation.

9. An object sensing apparatus according to claim 8; wherein the filter member is disposed within a distance measurable range of the distance measuring means and in the vicinity of a boundary of the distance measurable range.

10. An object sensing apparatus according to claim 1; wherein the light projecting means and the light receiving means are disposed in a plane in juxtaposed relation; and wherein the filter member has first and second portions, one of the first and second portions being disposed at an angle of inclination with respect to a light projecting axis of the light projecting means.

11. An object sensing apparatus according to claim 10; wherein the filter member is disposed within a distance measurable range of the distance measuring means and in the vicinity of a boundary of the distance measurable range.

12. An object sensing apparatus according to claim 1; wherein the filter member is disposed within a distance measurable range of the distance measuring means and in the vicinity of a boundary of the distance measurable range.

13. An object sensing apparatus comprising: a distance measuring device for measuring a distance to an object to be sensed, the distance measuring device having a light projecting element for projecting light toward the object, and a light receiving element for receiving the light projected by the light projecting element and reflected by the object; and a filter member disposed in confronting and spaced-apart relation to the distance measuring device and having a first portion, a second portion, a first end and a second end opposite the first end, the filter member being disposed at a preselected angle of inclination with respect to the distance measuring device so that a distance between the first end of the filter member and the light projecting element is greater than a distance between the second end of the filter member and the light receiving element, the first portion being disposed at the angle of inclination with respect to a light projecting axis of the light protecting element and the second portion being disposed perpendicular to the light protecting axis.

14. An object sensing apparatus according to claim 13; wherein the angle of inclination of the filter member is selected to allow the filter member to reflect light projected by the light projecting element in a direction away from the light receiving element.

15. An object sensing apparatus according to claim 13; wherein the filter member has a central bent portion disposed between the first and second portions.

16. An object sensing apparatus comprising: a distance measuring device for measuring a distance to an object to be sensed, the distance measuring device having a light projecting element for projecting light toward the object and a light receiving element for receiving the light projected by the light projecting element and reflected by the object, the light projecting element and the light receiving element being disposed in a plane in juxtaposed relation; and a filter member disposed in confronting and spaced-apart relation to the distance measuring device, the filter member having a surface portion for reflecting light projected by the light projecting element having a preselected brightness, the surface portion being disposed at a preselected angle of inclination with respect to a light projecting axis of the light protecting element such that when the light projecting element projects light toward the object, light reflected or scattered by the filter member is directed in a direction away from the light receiving element, and a distance between a first end of the filter member and the light projecting element being greater than a distance between a second end of the filter member opposite the first end and the light receiving element.

17. An object sensing apparatus according to claim 16; wherein the filter member is disposed within a distance measurable range of the distance measuring device and in the vicinity of a boundary of the distance measurable range.

18. An object sensing apparatus comprising: a distance measuring device for measuring a distance to an object to be sensed, the distance measuring device having a light projecting element for projecting light toward the object and a light receiving element for receiving the light projected by the light projecting element and reflected by the object; and a filter member having first and second portions and being disposed in confronting and spaced-apart relation to and at a preselected angle of inclination with respect to the distance measuring device such that when the light projecting element projects light toward the object, light reflected or scattered by the filter member is directed in a direction away from the light receiving element, the first portion being disposed at the angle of inclination with respect to a light projecting axis of the light projecting element and the second portion being disposed perpendicular to the light projecting axis.

19. An object sensing apparatus according to claim 18; wherein the filter member has a central bent portion disposed between the first and second portions.

20. An object sensing apparatus comprising: a distance measuring device for measuring a distance to an object to be sensed, the distance measuring device having a light projecting element for projecting light toward the object and a light receiving element for receiving the light projected by the light projecting element and reflected by the object; and a filter member disposed in confronting and spaced-apart relation to the distance measuring device, the filter member having a first portion disposed at an angle of inclination with respect to a light projecting axis of the light projecting element and a second portion disposed perpendicular to the light projecting axis.

21. An object sensing apparatus according to claim 20; wherein the angle of inclination of the first portion of the filter member is selected to allow the first portion of the filter member to reflect light projected by the light projecting element in a direction away from the light receiving element.

* * * * *